F. H. Williams.

Bank Safe.

Sheet 1
2 Sheets.

No. 4,001.

Reissued May 31, 1870.

Witnesses.
R. T. Campbell
J. N. Campbell

Inventor:
Francis H. Williams
by his agent
Mason, Fenwick & Lawrence

F. H. Williams.
Bank Safe.
Sheet 2.
2 Sheets
No. 4,001. Fig. 4.
Reissued May 31, 1870.
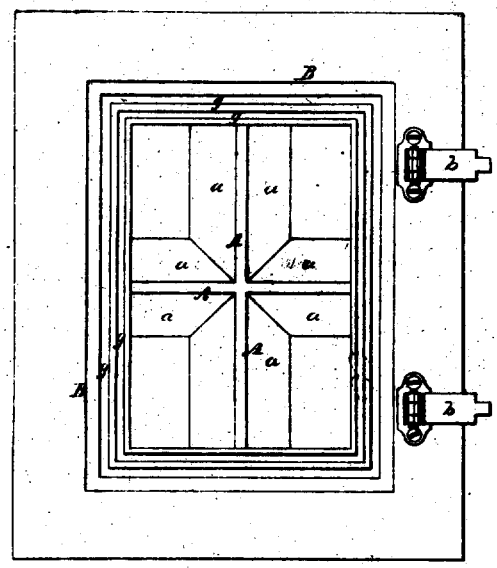
Fig. 5.
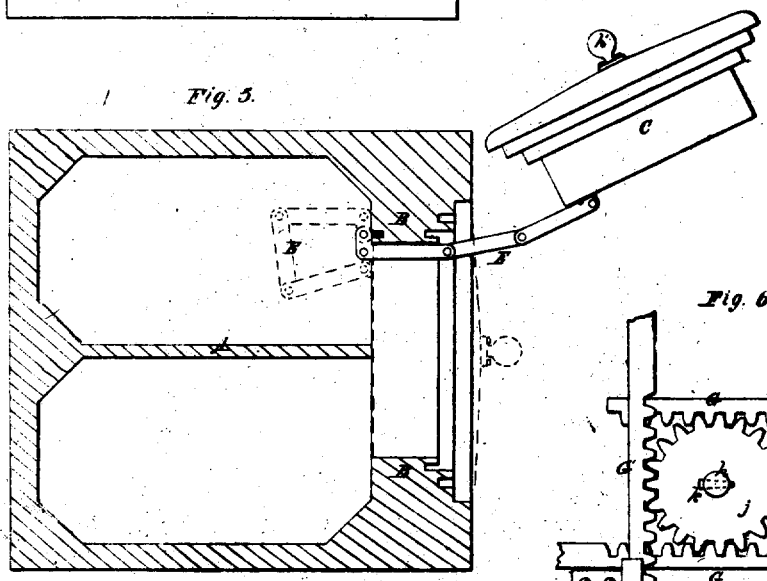
Fig. 6.
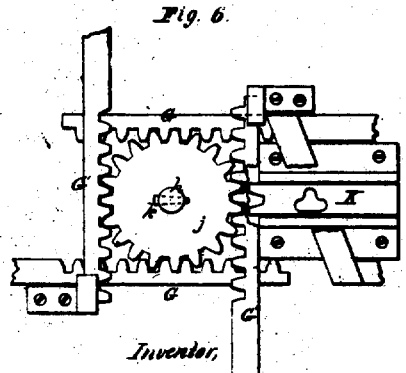
Witnesses,
R. F. Campbell
Chas. Campbell
Inventor,
Francis H. Williams
by his agents
Mason, Fenwick & Lawrence

UNITED STATES PATENT OFFICE.

FRANCIS H. WILLIAMS, OF SYRACUSE, NEW YORK.

IMPROVEMENT IN CONSTRUCTION OF SAFES.

Specification forming part of Letters Patent No. 85,978, dated January 19, 1869; reissue No. 4,001, dated May 31, 1870.

*To all whom it may concern:*

Be it known that I, FRANCIS H. WILLIAMS, of Syracuse, in the county of Onondaga and State of New York, have invented certain new and useful Improvements on Safes and Vaults; and I do hereby declare that the following is a full, clear, and exact description thereof, reference being had to the accompanying drawing, making a part of this specification, in which—

Figure 1:
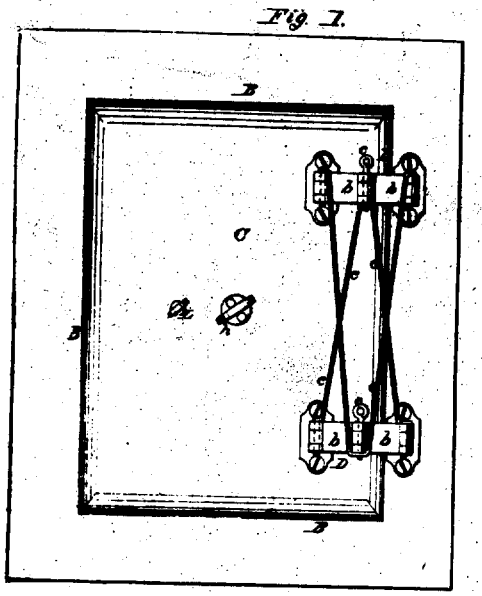
Figure 3:
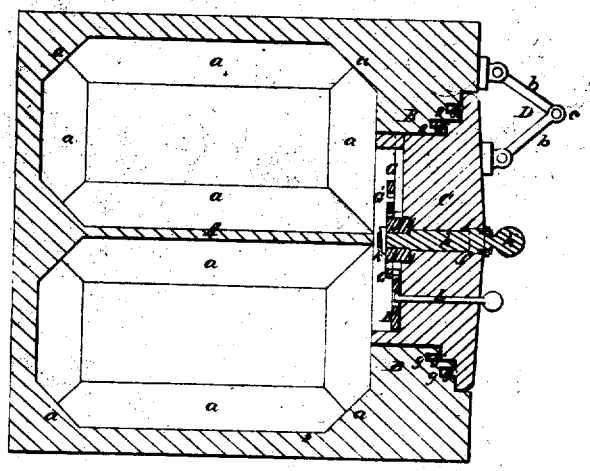
Figure 2:
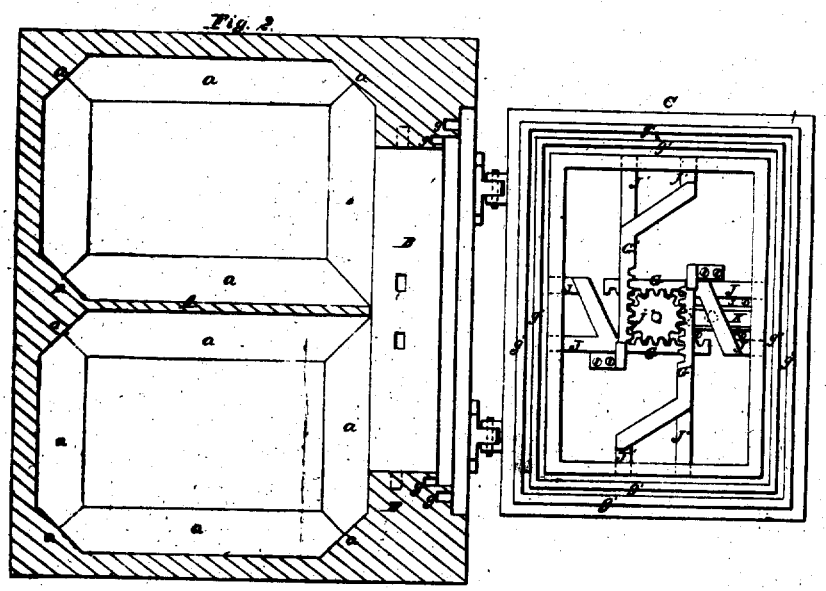

Figure 1, Plate 1, is a front elevation of the improved safe or vault, having its door hinged to the outside of the same. Fig. 2, Plate 1, is a vertical section taken longitudinally through the safe or vault, showing its door thrown open, and exposing the bolts thereon. Fig. 3, Plate 1, is a horizontal section of the safe or vault, with the door shut. Fig. 4, Plate 2, is a front view of the safe or vault, with the door detached. Fig. 5, Plate 2, is a horizontal section of a safe or vault having its door applied by hinges which are wholly upon the inside. Fig. 6, Plate 2, is a view in detail of the devices for operating the bolts and for locking the same.

Similar letters of reference indicate corresponding parts in the several figures.

This invention relates particularly to certain new and useful improvements on the construction of safes, vaults, and other repositories for the preservation of valuable objects.

The first part of my invention consists in constructing the body of a safe or vault with vertical and horizontal partitions in the chamber of deposit, which partitions are so applied to the walls surrounding such chamber as to serve as braces for strengthening them against external pressure and concussion, in the event of the falling of the walls of a building during a fire, or an attempt to open the safe by crushing in its walls, as will be hereinafter explained; and, in conjunction with such internal braces, this part of my invention also consists in further strengthening the walls of a safe, by casting with or otherwise applying braces or brackets to the interior angular corners of the walls, as will be hereinafter explained.

The second part of my invention consists in providing for moving four bolts in four different directions, by means of a spur-wheel, which is applied upon a shouldered knob-spindle, and in combining with said four-throw spur-wheel a device by which this wheel can be locked and prevented from turning, as will be hereinafter explained.

The third part of my invention consists in the construction and operation of a door, which is so constructed and arranged that, while it is proof against the introduction of the wedges or the powder of the burglar, it greatly increases the security of the safe against the use of other contrivances for forcing it open, and especially that security which is aimed at in my patent of June 9, 1868, and upon which the patent now sought to be amended may, in this respect, be regarded as an improvement, as will be hereinafter more fully explained.

The invention finally consists in the application, to the door of a safe or other object, of inside folding hinges, which will allow the door to be swung open or shut, and which will, when the door is shut, be wholly inclosed and protected, as will be hereinafter explained.

To enable others skilled in the art to understand my invention, I will describe its construction and operation.

The body of the safe, which I have represented in the accompanying drawings, is cast of one piece of metal, and I prefer to construct the safe in this manner, as I believe that greater security against effecting an entrance through its walls will be thereby obtained than would be obtained by building up the safe of separate plates secured together in the manner hitherto adopted. I do not, however, confine my invention to making the body of a safe of one piece by casting, as the same may be made of separate plates, as above mentioned. In constructing the body of the safe, I form, in the chamber of deposit, vertical and horizontal partitions A A, which cross each other and serve as braces for sustaining the walls, inclosing the chamber of deposit against external pressure and concussion.

If the body of the safe is cast in one piece, the partition-walls or braces A will be cast solid with the walls of the safe, but if the body of the safe is made up of separate plates, the braces A will be separately made and secured in their places. I also construct upon the inner side of the body of the safe, along the angles or corners thereof, the brackets *a a*, which thicken and strengthen the metal at such points, and greatly add to the strength of the safe.

The strength which is afforded by the use of braces A and brackets or corner pieces *a* will enable me to make the walls of the safe thinner than would otherwise be required.

Like the braces A, the corner-pieces *a* may be cast with the walls of the safe, or made separate, and secured in any suitable manner to such walls.

The door-frame or jamb B, which surrounds the opening leading to the chamber of deposit, is constructed with one or more grooves or channels, *g g*, which are perpendicular, or nearly so, to the front face of the safe, and which are so formed as to receive the snugly-fitting tenons *g' g'*, which are formed upon the inner side of the safe-door C. These channels and tenons extend around the opening and the door on all their four sides. By thus constructing the door and fitting it to its frame, it cannot swing around hinges at one of its edges, either to be closed or opened. An attempt to force it open by a power applied near either of its sides would tend to produce a rotation around its opposite side as a fulcrum. It would be manifestly impracticable to effect an entrance in that way, even without much reliance upon the bolts by which the door is secured in place. It, therefore, adds greatly to the security, which is often a matter of such great importance. This end is to a considerable extent attained in my patent of June 9, 1868, above referred to; but it is much more effectually secured by my present invention. For illustration, suppose an outward-acting force to be applied near the side *o'* of the door, Fig. 5. This would have a tendency to swing the door around its edge *o*. The points *s* and *t* will tend to move in a circle, of which *o* is the center, and will, therefore, be entirely prevented from moving by the position of the sides *s s'* and *t t'*, without calling into requisition, to any considerable extent, the bolts by which the door is fastened in place. The door cannot, therefore, be opened without being drawn backward in the direction of the line *s s'*. Now, it is manifest that the deeper these faces *s s'* and *t t'* are made, the more decisive will be the effect just described. The formation of the grooves and tenons *g g'* increases the depth of these faces, even although the number of these steps was not diminished. But by rendering it impossible to introduce wedges or powder in consequence of these grooves and tenons, the number of these steps may be greatly lessened, and their depth, therefore, proportionately increased from that cause.

I do not profess to have been the first to have constructed a tongue and groove around the door of a safe, inasmuch as the English patent of Samuel Chatwood, and also that of John Tann, both dated in March, 1865, exhibit specimens of such tongues and grooves. But the former of these patentees shows no means by which such a door can be operated except by lifting it in and out of place by main strength, and it cannot be moved upon ordinary hinges for manifest reasons. He does not, therefore, accomplish the purposes at which I am aiming. Tann's door moves on hinges in the usual way; but he constructs his grooves widest at the bottom, with a tenon of a corresponding shape, and then leaves so much play between the tenon and the groove as to permit the door to open and shut freely on its hinges. But if a wedge were driven in upon one side of the door, it is supposed that the beveled faces of the groove and tenon would be crowded together, so as to prevent the possibility of the door being forced open in that manner. I do not contemplate the interlocking of beveled or dovetailed grooves and tenons, and, therefore, the operation of my invention is entirely different from this in its principle.

To give the greatest possible efficiency to the contrivance proposed by me, the proper faces of the tongues and grooves should be in planes which are perpendicular to the front face of the door, and these tongues and grooves should be made to fit as closely as practicable. The door could then be moved perpendicularly backward or forward from or to its seat, but the slightest variation would produce a binding effect, which would prevent motion altogether, even although the door was held by no bolt. These more perfect conditions may, however, be somewhat departed from without destroying the efficacy of my invention. The more nearly perpendicular it is moved in being brought home to its seat, and in being brought back out of it, the more effectual its operation, and the greater perfection and ease of construction will be attainable in the manufacture of the safe.

To effect this perpendicular withdrawal of the door from its seat until it becomes sufficiently disengaged from the jambs of the safe, we use compound hinges D D, each having two or more joints. I prefer, for this purpose, a triple-jointed hinge, as shown in the drawing, Fig. 3. Each of these hinges, as there represented, is composed of two sections or leaves, *b b*, jointed together by a removable pintle, *c*, and hinged respectively to the door and its jamb. This I consider the most complete and perfect method of hinging the door to effect the object in view.

Now, I do not claim to have been the first to construct the door of a safe or vault in such a way that it must be withdrawn squarely from its seat, till it is disengaged from its jamb, before it is made to swing back on its hinges, inasmuch as circular doors have been made with screw-threads cut upon them, so that they might be drawn squarely backward from their seats, by unscrewing, before giving them this swinging motion. I claim no spiral threads, and I use no circular door.

The safe-door C may be cast solid, or it may be made in any other suitable manner.

These hinges, which are fully describ the schedule annexed to my Letters Patent numbered 78,851, will allow the door to be moved bodily into and out of the opening surrounded by frame B, and will also allow the door to swing freely.

I connect the hinges D D together by means of diagonal braces *e e e e*, as shown in Fig. 1, for the purpose of strengthening them, and admitting of the use of comparatively light leaves *b b*. The said braces are secured, in a suitable manner, to several pivots or pintles of the hinges, so as to allow the latter to articulate freely.

Instead of applying hinges to the outside of the door and body of the safe, it may be found desirable to apply hinges upon the inner side of the door and body of the safe.

Fig. 5 is a horizontal section, taken through the body of the safe, showing a door hinged to it by means of inside hinges E, each one of which is constructed of three leaves or sections, so that they will allow the door to be opened and shut. When the door is shut, the hinges E will be entirely inclosed within the chamber of deposit, as indicated in red, Fig. 5, so that they cannot be reached nor used as a means for effecting an entrace into the safe, where its door is locked.

I will now describe my improved devices for bolting the door and locking the bolts. A hole is drilled centrally through the door, and reamed out from the outside, so as to enlarge it at and near its outer end, and leave a shoulder, *f*, and into this hole a knob-spindle, *h*, is passed from the outside, which spindle is also shouldered, so that it cannot be driven through its hole by outside appliances. The outer enlarged end of the spindle *h* is flush with the outer surface of the door, and has a knob, *h'*, attached to it by screws or other suitable fastenings. The inner end of the said spindle has keyed upon it a spur-wheel, *j*, and receives also a pin, *k*. The spur-wheel has a cylindrical portion, *i*, formed on it, which is fitted into a recess made in the door, as shown in Fig. 3. The teeth of wheel *j* engage with four racks, G G G' G', two of which move in opposite directions vertically, and two move in opposite directions horizontally. These racks work in suitable guides, and have the bolts J J' applied to their outer ends, all of which bolts are thrown out or retracted simultaneously by turning the knob-spindle *h*.

I have represented two bolts upon the outer end of each rack-bar; but, in practice, one bolt or several may be employed, and formed on or secured to each rack-bar, in any suitable manner.

In Figs. 2 and 6, I have represented a notched bar, K, applied to the inner face of the door C, on one side of the spur-wheel *j*, and arranged to slide in suitable guides *n*. This bar represents the bolt of a lock, and is designed to engage with one of the teeth of wheel *j*, and prevent this wheel from turning.

I have represented a key, L, applied to the sliding bar *k*, for moving it back and forth; but, in practice, any well-known lock mechanism, which will answer the purpose, may be employed for moving the said bar.

I am aware that it is not new to employ jointed connections for moving several bolts in opposite directions, and, therefore, I shall not claim this feature broadly.

The employment of a single spur-wheel, with rack-bars, as described, obviates the difficulties attending jointed links or levers, and is more certain in its operation.

I am aware that safes have been constructed having grooves and tenons, analogous to mine, extending around on three sides of the door, which moved upon hinges in the usual way; but no one has ever before been contrived which admitted of having such grooves and tenons on all four sides thereof, when the door was rectangular in shape, and when, at the same time, it was sustained by and moved upon hinges. An imperfect arrangement of this character might be effected by placing the hinges at a considerable distance from the nearest edge of the door, thus giving a long sweep, which would allow of a defective application of the principle of my invention; but the construction herein contemplated is much more effective and can be more perfectly and conveniently fabricated.

What I claim as new, and desire to secure by Letters Patent, is—

1. The safe or vault, with partition-braces A in its chamber of deposit, whether such safe or vault be constructed of one or more pieces, substantially as described.

2. The fillets *a* in the walls of a safe, at the interior angles thereof, by casting its interior corners or angles in the form shown.

3. The combination of hinges D D, each having two or more joints, whereby the door of a safe or vault can be wholly supported and moved into and out of its seat, with a door having one or more tenons, *g' g'*, on each of its four sides, there being also corresponding grooves or recesses in the frame B, when such grooves and tenons are made of such form and so closely fitting as to render it impossible for such door to move around single-jointed hinges at one of its edges, the whole constructed and operating substantially as described.

4. The hinges E, wholly upon the inside of the door and door-frame of a safe or other structure, substantially as described.

Witness my hand, in the matter of my application for a patent for improvement in bank-safe and bolt.

FRANCIS H. WILLIAMS.

Witnesses:
G. S. LEONARD,
JAS. BARNES.